(12) United States Patent
Haubennestel et al.

(10) Patent No.: US 7,947,777 B2
(45) Date of Patent: May 24, 2011

(54) DISPERSING AGENT FOR PIGMENT CONCENTRATES, ITS USE AND MASTERBATCHES COMPRISING THE DISPERSING AGENT

(75) Inventors: Karlheinz Haubennestel, Wesel (DE); Alfred Bubat, Wesel (DE); Udo Krappe, Emmerich (DE); Barbel Gertzen, Emmerich (DE); Joerg Garlinsky, Wesel (DE); Wolfgang Pritschins, Wesel (DE)

(73) Assignee: BYK-Chemie GmbH (DE)

( * ) Notice: Subject to any disclaimer, the term of this patent is extended or adjusted under 35 U.S.C. 154(b) by 599 days.

(21) Appl. No.: 11/547,488

(22) PCT Filed: Mar. 10, 2005

(86) PCT No.: PCT/EP2005/002515
§ 371 (c)(1),
(2), (4) Date: Aug. 28, 2008

(87) PCT Pub. No.: WO2005/097872
PCT Pub. Date: Oct. 20, 2005

(65) Prior Publication Data
US 2008/0319123 A1  Dec. 25, 2008

(30) Foreign Application Priority Data
Mar. 31, 2004 (DE) .................. 10 2004 016 479

(51) Int. Cl.
*C08G 63/08* (2006.01)
*C08G 18/42* (2006.01)
*C08G 77/42* (2006.01)
*C08J 3/20* (2006.01)

(52) U.S. Cl. ........... 524/539; 523/351; 528/26; 528/307
(58) Field of Classification Search .................. 524/539; 528/26, 307; 523/351
See application file for complete search history.

(56) References Cited

U.S. PATENT DOCUMENTS

| | | | | |
|---|---|---|---|---|
| 2,455,731 | A | * | 12/1948 | Caldwell ........................ 528/355 |
| 3,748,308 | A | | 7/1973 | Ashe et al. |
| 3,806,473 | A | * | 4/1974 | Lombardi et al. ............. 521/162 |
| 5,306,590 | A | | 4/1994 | Felder |
| 5,362,519 | A | * | 11/1994 | Argyropoulos et al. ... 427/385.5 |
| 5,599,862 | A | | 2/1997 | Köhler et al. |
| 6,410,647 | B1 | | 6/2002 | Yoshioka et al. |
| 7,504,469 | B2 | * | 3/2009 | Haubennestel et al. ........ 528/25 |

FOREIGN PATENT DOCUMENTS

| | | |
|---|---|---|
| EP | 0328206 A2 | 2/1989 |
| JP | 58-174455 | 10/1983 |
| JP | 60137967 A | 7/1985 |
| WO | WO-97/38975 A2 | 10/1997 |
| WO | WO-02085507 A2 | 10/2002 |

OTHER PUBLICATIONS

"International Search Report for Application No. PCT/EP2005/002515", 4 Pages, 2006.

* cited by examiner

*Primary Examiner* — Tae H Yoon
(74) *Attorney, Agent, or Firm* — Schwegman, Lundberg & Woessner, P.A.

(57) ABSTRACT

The invention relates to polyesters which contain carboxy groups and which are used as dispersing agents for pigment concentrates for the colouring of thermoplastics, and to a process for their preparation. The invention further relates to the use of the polyesters as dispersing agents, and also to masterbatches which comprise pigments, thermoplastics and the polyesters.

6 Claims, No Drawings

DISPERSING AGENT FOR PIGMENT CONCENTRATES, ITS USE AND MASTERBATCHES COMPRISING THE DISPERSING AGENT

RELATED APPLICATIONS

This application is a nationalization under 35 U.S.C. 371 of PCT/EP2005/002515, filed Mar. 10, 2005 and published as WO 2005/097872 A1 on Oct. 20, 2005, which claimed priority under U.S.C. 119 to German Application No. 10 2004 016 479.7, filed Mar. 31, 2004, which applications and publication are incorporated herein by reference and made a part hereof.

The present invention relates to a dispersing agent for pigment concentrates for the colouring of thermoplastics. It also relates to the use of the dispersing agent and to masterbatches which comprise the dispersing agent.

Pigments, fillers and other fine-particle solids can be incorporated more easily into coating compositions and plastics compositions via addition of dispersing agents, which are also termed wetting agents. The energy needed for dispersion is reduced, and the homogeneity and storage-stability of the final products are improved. Furthermore, the colour strength of pigments increases as a result of the fine dispersion, and their productivity therefore rises.

During the colouring of plastics, in particular of thermoplastics, a number of problems can arise, attributable to defects in incorporation of the pigments used as colorants. For example, plastics coloured with transparent pigments or with lustre pigments often do not have the desired appearance.

Plastics coloured with pigments are transparent if the pigment particles, whose size is usually <15 nm, have been finely dispersed. However, these small primary pigment particles have a marked tendency to agglomerate. During production of paints, these agglomerates are comminuted in specialized mills at great cost. Pigments that are hard to disperse, such as transparent iron oxide pigments, carbon black pigments and perylene pigments, do not generally produce speck-free transparent coloured materials on incorporation into plastics, even when corotating twin-screw extruders are used, without disproportionate degradation of the plastic.

In the case of lustre pigments based on lamellar pigment particles, an alteration in pigment particle size and pigment particle shape is often observed during incorporation into the plastic. The colour of the resultant coloured materials is then less attractive than that of paints produced with these pigments, and lacks brilliance and the typical deep satin lustre.

It is known that waxes can be used as dispersing agents during the colouring of thermoplastics. However, these waxes merely wet the pigments and do not stabilize them. Furthermore, migration problems often arise in the final product.

DE 100 57 164 A1 discloses, as dispersing agents for thermoplastics, polymeric compounds which are obtainable via reaction of (co)polymers of $C_1$-$C_{25}$-alkyl esters of $\alpha,\beta$-unsaturated carboxylic acids having a terminal hydroxy group, with polyfunctional isocyanates, and further reaction of the resultant products with ammonia or with polyfunctional amines.

It is an object of the present invention to provide dispersing agents which give better properties during the pigmentation of thermoplastics. In particular, the intention is to achieve better colour strength, and to reduce formation of pigment agglomerates, because these lead to pigment specks, i.e. to non-uniform colouring of the plastic. The intention is to inhibit migration of the pigments within the final product and finally to provide dispersing agents which are solid at room temperature, thus easing their metering and their incorporation into the plastics. Room temperature is a temperature of 25° C.

Surprisingly, it has been found that the objects mentioned can be achieved via specific polyesters containing carboxy groups and used as dispersing agents.

The present invention therefore provides a dispersing agent of the type mentioned at the outset, which has the general formula

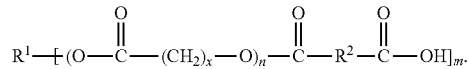

in which $R^1$ is the organic radical of an alcohol having from 1 to 3 OH groups, or the radical of a polysiloxane which has from 1 to 3 hydroxy groups not bonded to a silicon atom, $R^2$ is a divalent, straight-chain or branched aliphatic or cycloaliphatic radical, x is from 2 to 18, n is from 10 to 500 and m is from 1 to 3, where the dispersing agent has a molar mass of from 1000 to 20000 g/mol and an acid number of from 3 to 180 mgKOH/g and is solid at room temperature.

U.S. Pat. No. 3,748,308 discloses polyesters which contain carboxy groups and which are used as dispersing agents for the dispersion of solid particles in organic liquids. The known compounds differ structurally from the dispersing agents of the present invention in that they necessarily contain radicals of aromatic carboxylic acids as carriers of the carboxy groups. The use of the known dispersing agents for the dispersion of pigments or the like in thermoplastic compositions is not described.

Examples of thermoplastics are the polyolefins, e.g. polyethylene and polypropylene, acrylic resins, styrene polymers, polycarbonates, polyamides, polyesters, thermoplastic polyurethanes, polyether sulphones, polysulphones, vinyl polymers and mixtures of these, particularly suitable materials being the acrylic resins, the styrene polymers and the thermoplastic polyurethanes.

Suitable acrylic resins which may be mentioned are the polyalkyl and/or polyaryl esters of (meth)acrylic acid, poly (meth)acrylamides and poly(meth)acrylonitrile. Preferred acrylic resins are polyalkyl methacrylates, among which are those in impact-modified form, and particular preference is given here to polymethyl methacrylate (PMMA) and impact-modified polymethyl methacrylate (HI(High-Impact) PMMA). The PMMA preferably contains a proportion which is generally not more than 20% by weight of (meth)acrylate comonomers, such as n-butyl (meth)acrylate or methyl acrylate. HIPMMA has been rendered impact-resistant via suitable additives. Examples of impact modifiers which may be used are EPDM rubbers, polybutyl acrylates, polybutadiene, polysiloxanes or methacrylate-butadiene-styrene (MBS) copolymers and methacrylate-acrylonitrile-butadiene-styrene copolymers. Suitable impact-modified PMMAs have been described by way of example by M. Stickler, T. Rhein in Ullmann's encyclopedia of industrial chemistry Vol. A21, pages 473-486, VCH Publishers Weinheim, 1992, and H. Domininghaus, Die Kunststoffe und ihre Eigenschaften [Plastics and their properties], VDI-Verlag Düsseldorf, 1992. Suitable polymethyl methacrylates are otherwise known to the person skilled in the art and are obtainable by way of example under the trademarks Lucryl® (BASF AG) and Plexiglas® (Röhm GmbH).

Styrene polymers which may be used are any of the (co) polymers which are composed entirely or in part of vinylaromatic compounds. Examples of suitable vinylaromatic compounds are styrene and styrene derivatives, such as mono- or polyalkyl-substituted and/or halogen-substituted styrene, and also corresponding naphthyl compounds. Styrene copolymers are preferably utilized.

Among these, by way of example, are graft copolymers of acrylonitrile and styrene on butadiene rubbers, also known as ABS polymers (e.g. the commercially available product Terluran® from BASF AG), graft copolymers of styrene and acrylonitrile on polyalkyl acrylate rubbers, also known as ASA polymers (e.g. the commercially available product Luran® S from BASF AG), or styrene-acrylonitrile copolymers, also known as SAN copolymers (e.g. the commercially available product Luran® from BASF AG). Styrene polymers which are particularly preferred polymers are ASA polymers.

Suitable polycarbonates are known per se. For the purposes of the invention, the term polycarbonates also includes copolycarbonates. The (co)polycarbonates preferably have a molar mass (weight average $M_w$, determined by means of gel permeation chromatography in tetrahydrofuran against polystyrene standards) in the range from 10000 to 200000 g/mol. $M_w$ is preferably in the range from 15000 to 100000 g/mol. This corresponds to relative solution viscosities in the range from 1.1 to 1.5, measured in 0.5% strength by weight solution in dichloromethane at 25° C., preferably from 1.15 to 1.33.

Polycarbonates are obtainable by way of example by the processes of DE-C-13 00 266 via interfacial polycondensation or according to the process of DE-A-14 95 730 via reaction of diphenyl carbonate with bisphenols. Preferred bisphenol is 2,2-di(4-hydroxyphenyl)propane, usually termed bisphenol A.

Use may also be made of other aromatic dihydroxy compounds other than bisphenol A, in particular 2,2-di(4-hydroxyphenyl)pentane, 2,6-dihydroxynaphthaline, 4,4'-dihydroxydiphenyl sulphane, 4,4'-dihydroxydiphenyl ether, 4,4'-dihydroxydiphenyl sulphite, 4,4'-dihydroxydiphenylmethane, 1,1-di(4-hydroxyphenyl)ethane, 4,4-dihydroxbiphenyl, or dihydroxydiphenylcycloalkanes, preferably dihydroxyphenylcyclohexanes or dihydroxyphenylcyclopentanes, in particular 1,1-bis(4-hydroxyphenyl)-3,3,5-trimethylcyclohexane, or else a mixture of the abovementioned dihydroxy compounds.

Particularly preferred polycarbonates are those based on bisphenol A or bisphenol A together with up to 80 mol % of the abovementioned aromatic dihydroxy compounds.

It is also possible to use copolycarbonates according to U.S. Pat. No. 3,737,409. Copolycarbonates based on bisphenol A and bis(3,5-dimethyl-4-hydroxyphenyl) sulphone and/or 1,1-bis(4-hydroxyphenyl)-3,3,5-trimethylcyclohexane are of particular interest, and feature high heat resistance.

Examples of commercially available materials are the polycarbonates Makrolon® (Bayer) and Lexan® (GE Plastics).

Suitable polyamides (PA) can be polycondensation products of diamines and dicarboxylic acid, e.g. adipic acid and hexamethylenediamine, or of amino acids, e.g. aminoundecanoic acid, or can be prepared via ring-opening polymerization of lactams, e.g. caprolactam or laurolactam. By way of example, mention may be made of Ultramid® (BASF AG), Zytel® and Minlon® (DuPont), Sniamid®, Technyl® and Amodel® (Nyltech), Durethan® (Bayer), Akulon® and Stanyl® (DSM), Grilon®, Grilamid® and Grivory® (EMS), Orgamid® and Rilsan® (Atochem) and Nivionplast® (Enichem).

Other polyamides which may be used are mixtures composed of polyamides and of polyethylene ionomers, e.g. ethene-methacrylic acid copolymers, containing by way of example sodium counterions, zinc counterions and/or lithium counterions (inter alia under trademark Surlyn® (DuPont)).

Suitable polyesters are the relatively-high- or high-molecular-weight esterification products of dibasic acids, in particular terephthalic acid, with dihydric alcohols, especially ethylene glycol. Among the polyalkylene terephthalates, polyethylene terephthalate (PET); Arnite® (Akzo), Grilpet® (EMS-Chemie), Valox® (GEP)) is particularly suitable.

Thermoplastic polyurethanes (TPU) are fundamentally the reaction products of diisocyanates and of long-chain diols. Unlike the polyurethane foams obtained from polyisocyanates (containing at least three isocyanate groups) and from polyhydric alcohols (containing at least three hydroxy groups), in particular from polyether and from polyester polyols, thermoplastic polyurethanes have no, or only very slight, crosslinking and accordingly have a linear structure. Thermoplastic polyurethanes are well known to the person skilled in the art and are described by way of example in Kunststoff-Handbuch [Plastics handbook], Volume 7, Polyurethane, ed. G. Oertel, 2nd edn., Carl Hanser Verlag, Munich, 1983, particularly on pages 428, 473. An example which may be mentioned here of a commercially available product is Elastolan® (Elastogran).

The polymer classes of the polyether sulphones and polysulphones are likewise known to the person skilled in the art and are commercially available under the trademark Ultrason® E and Ultrason® S.

Finally, an example which may be mentioned of a suitable vinyl polymer is polyvinyl chloride (PVC). Copolymers of vinyl chloride which can be prepared by the known processes (e.g. suspension, bulk or emulsion polymerization), copolymers of vinyl chloride with up to 30% by weight of comonomers, such as vinyl acetate, vinylidene chloride, vinyl ether, acrylonitrile, acrylate, maleic mono- or diesters or olefins, and also graft polymers of polyvinyl chloride and polyacrylonitrile, are suitable thermoplastics. Preferred thermoplastics are polyolefins, and particular preference is given to polyethylene and polypropylene, e.g. HDPE, LDPE, LLDPE and VLDPE. The thermoplastics may be processed via injection moulding, extrusion, blow moulding, blown-film extrusion, fibre spinning, rotational moulding or calendering.

Use of the inventive dispersing agents permits dispersion of a wide variety of organic or inorganic pigments in thermoplastics. These pigments may be organic non-neutral pigments, white pigments and black pigments (colour pigments) and liquid-crystal pigments. Inorganic pigments may likewise be colour pigments or else lustre pigments and the inorganic pigments usually used as fillers.

Some examples of suitable organic colour pigments may be mentioned below:

Monoazo Pigments:
C.I. Pigment Brown 25;
C.I. Pigment Orange 5, 36 and 67;
C.I. Pigment Red 3, 48: 2, 48: 3, 48: 4, 52: 2, 63, 112 and 170;
C.I. Pigment Yellow 3, 74, 151 and 183;
Disazo Pigments:
C.I. Pigment Red 144, 166, 214 and 242;
C.I. Pigment Yellow 83;
Anthraquinone Pigments:
C.I. Pigment Yellow 147 and 177;
C.I. Pigment Violet 31;
Benzimidazole Pigments
C.I. Pigment Orange 64;

Quinacridone Pigments:
C.I. Pigment Orange 48 and 49;
C.I. Pigment Red 122, 202 and 206;
C.I. Pigment Violet 19;
Quinophthalone Pigments:
C.I. Pigment Yellow 138;
Diketopyrrolopyrrole Pigments:
C.I. Pigment Orange 71 and 73;
C.I. Pigment Red 254, 255, 264 and 270;
Dioxazine Pigments:
C.I. Pigment Violet 23 and 37;
Indanthrone Pigments:
C.I. Pigment Blue 60;
Isoindoline Pigments:
C.I. Pigment Yellow 139 and 185;
Isoindolinone Pigments:
C.I. Pigment Orange 61;
C.I. Pigment Yellow 109 and 110;
Metal Complex Pigments:
C.I. Pigment Yellow 153;
Perinone Pigments:
C.I. Pigment Orange 43;
Perylene Pigments:
C.I. Pigment Black 32;
C.I. Pigment Red 149, 178 and 179;
C.I. Pigment Violet 29;
Phthalocyanine Pigments:
C.I. Pigment Blue 15, 15: 1, 15: 2, 15: 3, 15: 4, 15: 6 and 16;
C.I. Pigment Green 7 and 36;
C.I. Pigment Black 1 (aniline black)
Examples of suitable inorganic colour pigments are:
White Pigments:
titanium dioxide (C.I. Pigment White 6), zinc white, pigment-grade zinc oxide; zinc sulphide, lithopones;
Black Pigments:
iron oxide black (C.I. Pigment Black 11), iron manganese black, spinell black (C.I. Pigment Black 27); carbon black (C.I. Pigment Black 7);
Non-Neutral Pigments:
chromium oxide, chromium oxide hydrate green; chrome green (C.I. Pigment Green 48); cobalt green (C.I. Pigment Green 50); ultramarine green;
cobalt blue (C.I. Pigment Blue 28 and 36); ultramarine blue, manganese blue;
ultramarine violet; cobalt violet and manganese violet; iron oxide red (C.I. Pigment Red 101); cadmium sulphoselenide (C.I. Pigment Red 108); molybdate red (C.I. Pigment Red 104); ultramarine red;
iron oxide brown, mixed brown, spinell phases and corundum phases (C.I. Pigment Brown 24, 29 and 31), chrome orange; iron oxide yellow (C.I. Pigment Yellow 42); nickel titanium yellow (C.I. Pigment Yellow 53; (C.I. Pigment Yellow 157 and 164); chromium titanium yellow; cadmium sulphide and cadmium zinc sulphide (C.I. Pigment Yellow 37 and 35); chrome yellow (C.I. Pigment Yellow 34); bismuth vanadate (C.I. Pigment Yellow 184).

Examples which may be mentioned of inorganic pigments usually used as fillers are transparent silicon dioxide, powdered quartz, aluminium oxide, aluminium hydroxide, natural mica, natural and precipitated chalk and barium sulphate.

Alongside the organic liquid-crystal pigments, one particularly interesting class of suitable pigments is formed by the lustre pigments and special-effect pigments.

The optical effect of the lustre pigments is based on oriented reflection of light at the pigment particles which mostly have a flat shape, are oriented parallel to each other, and are metallic or have a high refractive index. Depending on the constitution of the pigment lamellae, interference phenomena, reflection phenomena and absorption phenomena produce perceived colour and lightness which are angle-dependent.

The lustre pigments may have either a single-phase structure or a multiphase structure.

Single-phase lustre pigments which are of particular interest are lamellar metal pigments, such as the commercially available aluminium lamellae.

The lustre pigments of multiphase structure may be based on lamellar substrate particles which are coated one or more times, or on particles which likewise have a layer-type structure and are produced via successive application of the desired layer materials in the manner of a film to a substrate foil, followed by removal of the substrate foil from the multilayer film and its commination to pigment particle size.

In the first-mentioned variant, the abovementioned lamellar metal pigments, in particular the aluminium lamellae, and oxidic lamellae, such as lamellae preferably composed of aluminium- and manganese-doped ferric oxide and mica lamellae are preferred substrate materials. In the variant mentioned second, preferred materials used for the central layer comprise metals, such as aluminium, and oxides, such as silicon dioxide. Coating materials used in both variants are usually metal oxides and metals.

Examples which may be mentioned of pigment lamellae having a single coating are lamellae composed of mica or of aluminium which have a coating of titanium dioxide, of ferric oxide or of lower titanium oxides and/or of titanium oxynitrides. Goniochromatic lustre pigments which exhibit particularly pronounced angle-dependent colour changes can be obtained via coating of the substrate lamellae (e.g. aluminium lamellae, iron oxide lamellae or previously titanium-dioxide-coated mica lamellae) with alternating layers of low-refractive-index materials, such as silicon dioxide and magnesium fluoride, and high-refractive-index materials, such as ferric oxide, titanium oxide and the other abovementioned titanium compounds.

Multiphase lustre pigments of this type are known and are commercially available, e.g. as Paliocrom® and Variocrom® (BASF), Iriodin®, Xirallic® and Colorstream® (Merck) and also Chromaflair® (Flex Products).

The radical $R^1$ is preferably a straight-chain or branched aliphatic radical having from 2 to 40 carbon atoms, particularly preferably having from 2 to 18 carbon atoms. It preferably contains 2 hydroxy groups.

Hydroxy-functional polysiloxanes which contain hydroxy groups not bonded to silicon atoms are described by way of example in the European patent EP 0 217 364 B1. Other suitable functional polysiloxanes are commercially available or can be prepared by known processes, such as those described in DE-C-1 236 505, U.S. Pat. No. 3,960,574, U.S. Pat. No. 4,076,695, U.S. Pat. No. 3,481,969, U.S. Pat. No. 3,442,925, U.S. Pat. No. 3,567,499 and U.S. Pat. No. 2,947,771.

Particularly preferred compounds which contain the radical $R^1$ are 1,2-propanediol and $\alpha,\omega$-hydroxyalkyl-functional dimethylpolysiloxane with a molar mass of 1800 g/mol.

The radical $R^2$ is preferably an aliphatic radical having from 2 to 40 carbon atoms, particularly preferably having from 2 to 18 carbon atoms. The adipic acid radical is very particularly preferred.

Other advantageous embodiments of the present invention are given in the subclaims.

The invention also provides a process for preparing a dispersing agent, characterized in that one or more cyclic lactones are reacted, with ring-opening, with an alcohol of the general formula R¹(OH)$_m$, in which R¹ is an organic radical and m is from 1 to 3, or with a polysiloxane which has from 1 to 3 hydroxy groups not bonded to a silicon atom, and the polyester obtained as precursor is reacted with a dicarboxylic acid or with a dicarboxylic anhydride to form a half-ester of the dicarboxylic acid.

Among the suitable cyclic lactones which can be used in the present invention are β-propiolactone, δ-valerolactone, ε-caprolactone, and lactones corresponding to the following acids: 2-methyl-3-hydroxypropionic acid, 3-hydroxynonanoic acid, 2-dodecyl-3-hydroxypropionic acid, 2-cyclopentyl-3-hydroxypropionic acid, 3-phenyl-3-hydroxypropionic acid, 2-(1-naphthyl)-3-hydroxypropionic acid, 2-butyl-3-cyclohexyl-3-hydroxypropionic acid, 3-hydroxypentadecanoic acid, 2-(2-methylcyclopentyl)-3-hydroxypropionic acid, 2-o-tolyl-3-hydroxypropionic acid, 3-benzyl-3-hydroxypropionic acid, 2,2-dimethyl-3-hydroxypropionic acid, 2-methyl-5-hydroxyvaleric acid, 3-cyclohexyl-5-hydroxyvaleric acid, 4-phenyl-5-hydroxyvaleric acid, 2-heptyl-4-cyclopentenyl-5-hydroxyvaleric acid, 2-methyl-3-phenyl-5-hydroxyvaleric acid, 3-(2-cyclohexylethyl)-5-hydroxyvaleric acid, 2-(2-phenylethyl)-4-propyl-5-hydroxyvaleric acid, 4-benzyl-5-hydroxyvaleric acid, 3-ethyl-5-isopropyl-6-hydroxycaproic acid, 2-cyclopentyl-4-hexyl-6-hydroxycaproic acid, 3-phenyl-6-hydroxycaproic acid, 3-(3,5-diethylcyclohexyl)-5-ethyl-6-hydroxycaproic acid, 4-(3-phenylpropyl)-6-hydroxycaproic acid, 2-benzyl-5-isobutyl-6-hydroxycaproic acid, 2,2,4-trimethyl-3-hydroxy-3-pentenoic acid, 2-phenyl-6-hydroxy-6-octenoic acid, and 2,2-dipropenyl-5-hydroxy-5-heptenoic acid. Mixtures of the lactones may be used.

The preferred lactone is ε-caprolactone.

The invention also provides a masterbatch, i.e. a concentrate, for incorporation into thermoplastics, comprising pigments, fillers and/or other fine-particle solids, thermoplastic and a polyester of the general formula

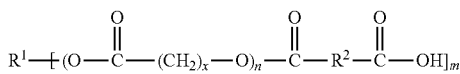

in which
R¹ is the organic radical of an alcohol having from 1 to 3 OH groups, or the radical of a polysiloxane which has from 1 to 3 hydroxy groups not bonded to a silicon atom, R² is a divalent, straight-chain or branched aliphatic or cycloaliphatic radical, x is from 2 to 18, n is from 10 to 500 and m is from 1 to 3, where the polyester has a molar mass of from 1000 to 20000 g/mol and an acid number of from 3 to 180 mgKOH/g and is solid at room temperature, and is present in a proportion of from 1 to 25% by weight, based on the total weight of the masterbatch.

The preferred proportion of the dispersing agent present in the masterbatch is from 5 to 20% by weight, based on the total weight of the masterbatch.

Alongside the inventive dispersing agent, other additives conventional in this technical sector may also be present in the colour masterbatches, examples being other dispersing agents, thermoplastics, plasticizers, waxes, stabilizers, including light stabilizers, antistatic agents, flame retardants, reinforcing materials, processing aids, lubricants and mould-release agents, impact modifiers, antioxidants, blowing agents or optical brighteners. The inventive compounds may be used in pure form or in the form of a formulation with other components conventional in the thermoplastics to be coloured and/or with the abovementioned additives.

The invention is illustrated in more detail below, using examples.

EXAMPLES

The invention is further illustrated by the examples below. In the case of molecularly non-uniform substances, the molecular weights stated are number-average values. The molecular weights or average molecular weights Mn may be determined by conventional methods, e.g. via determination of the OH number, of the acid number, cryoscopically or by gel permeation chromatography. Unless otherwise stated, parts are parts by weight and percentages are percentages by weight.

Preparation Examples

Precursor A1

Polyester Composed of N-Decanol and Epsilon-Caprolactone (Molar Ratio 1:25)

200 parts of n-decanol and 3593 parts of epsilon-caprolactone are homogenized under inert gas, treated with 0.3 part of dibutyltin dilaurate (DBTL) and heated to 180° C. The mixture is stirred at this temperature for about 6 hours until an SC (solids content) of 98% has been reached. The product with a molecular weight of about 3000 has a waxy structure at RT (room temperature) and has an OH number of 23.

Precursor A2

Polyester Composed of Glycerol and Epsilon-Caprolactone (Molar Ratio 1:26)

27 parts of glycerol and 872 parts of epsilon-caprolactone are homogenized under inert gas, treated with 0.05 part of DBTL and heated to 180° C. The mixture is stirred at this temperature for about 5 hours until an SC of 99% has been reached. The product with a molecular weight of about 3000 is solid at RT and has an OH number of 57.

Precursor A3

Polyester Composed of Sorbitan Monostearate and Epsilon-Caprolactone (Molar Ratio 1:23)

130 parts of sorbitan monostearate and 776 parts of epsilon-caprolactone are homogenized under inert gas, treated with 0.05 part of DBTL and heated to 180° C. The mixture is stirred at this temperature for about 7 hours until an SC of 97% has been reached. The product with a molecular weight of about 3000 is waxy at RT and has an OH number of 37.

Precursor A4

Polyester Composed of Polyethylene Glycol with an Average Molecular Weight of 200 and Epsilon-Caprolactone (Molar Ratio 1:25)

60 parts of the polyethylene glycol and 841 parts of epsilon-caprolactone are homogenized under inert gas, treated with 0.05 part of DBTL and heated to 180° C. The mixture is stirred at this temperature for about 8 hours until an SC of 97% has been reached. The product with a molecular weight of about 3000 is solid at RT and has an OH number of 44.

Precursor A5

Polyester Composed of 1,4-Butanediol and Epsilon-Caprolactone (Molar Ratio 1:26)

27 parts of 1,4-butanediol and 872 parts of epsilon-caprolactone are homogenized under inert gas, treated with 0.05 part of dibutyltin dilaurate (DBTL) and heated to 180° C. The mixture is stirred at this temperature for about 6 hours until an SC of 97% has been reached. The product with a molecular weight of about 3000 is solid at RT and has an OH number of 45.

Precursor A6

Polyester Composed of Methoxypolyethylene Glycol with an Average Molecular Weight of 500 and Epsilon-Caprolactone (Molar Ratio 1:3)

58 parts of the methoxypolyethylene glycol and 42 parts of epsilon-caprolactone are homogenized under inert gas, treated with 0.3 part of p-toluenesulphonic acid and heated to 80° C. The mixture is stirred at this temperature for about 2 hours until an SC of 99% has been reached. The product with a molecular weight of about 900 is liquid at RT and has an OH number of 63.

Precursor A7

Polyester Composed of Stearyl Alcohol and Epsilon-Caprolactone (Molar Ratio 1:24)

90 parts of stearyl alcohol and 908 parts of epsilon-caprolactone are homogenized under inert gas, treated with 0.08 part of dibutyltin dilaurate (DBTL) and heated to 180° C. The mixture is stirred at this temperature for about 5 hours until an SC of 99% has been reached. The product with a molecular weight of about 3000 is waxy at RT and has an OH number of 19.

Precursor A8

Polyester Composed of 1,2-Propanediol and Epsilon-Caprolactone (Molar Ratio 1:29)

7.6 parts of 1,2-propanediol and 332 parts of epsilon-caprolactone are homogenized under inert gas, treated with 0.05 part of dibutyltin dilaurate (DBTL) and heated to 180° C. The mixture is stirred at this temperature for about 6 hours until an SC of 98% has been reached. The product with a molecular weight of about 3400 is solid at RT and has an OH number of 34.

Precursor A9

Polyester Composed of 1,2-Propanediol and Epsilon-Caprolactone (Molar Ratio 1:43)

7.6 parts of 1,2-propanediol and 492 parts of epsilon-caprolactone are homogenized under inert gas, treated with 0.08 part of dibutyltin dilaurate (DBTL) and heated to 180° C. The mixture is stirred at this temperature for about 7 hours until an SC of 98% has been reached. The product with a molecular weight of about 5000 is solid at RT and has an OH number of 22.

Example 1

Half-Ester Composed of a Dibasic C36 Dimer Acid (Pripol 1022 from Unichema) and Precursor A6

180 parts of Pripol 1022 and 273 parts of precursor A6 are homogenized under inert gas, treated with 4.5 parts of alkylbenzenesulphonic acid and heated to 180° C. After about 4 hours, 6 parts of water had been eliminated and an AN (acid number) of 41.1 had been reached. The product is a waxy solid at RT.

Example 2

Half-Ester Composed of Pripol 1022 and Precursor A7

38 parts of Pripol 1022 and 197 parts of precursor A7 are homogenized under inert gas, treated with 2.4 parts of p-toluenesulphonic acid and heated to 160° C. After about 2.5 hours, 1.2 parts of water had been eliminated and an AN of 18.3 had been reached. The product is a waxy solid at RT.

Example 3

Half-Ester Composed of Pripol 1022 and Precursor A1

600 parts of Pripol 1022 and 3103 parts of precursor A1 are homogenized under inert gas, treated with 37 parts of alkylbenzenesulphonic acid and heated to 170° C. The solid obtained after elimination of 18.6 parts of water was waxy at RT with an AN of 20; other data: density 1.021 g/ml; SC 99%; viscosity at 80° C.: 700 mPas.

Example 4

Half-Ester Composed of Adipic Acid and Precursor A1

9.3 parts of adipic acid and 191 parts of precursor A1 are homogenized under inert gas, treated with 2 parts of dodecylbenzenesulphonic acid and heated to 180° C. After about 4 hours of water elimination an AN of 18 had been reached. The brownish product is a waxy solid at RT.

Example 5

Half-Ester Composed of Adipic Acid and Precursor A2

27.9 parts of adipic acid and 191 parts of precursor A2 are homogenized under inert gas, treated with 2.2 parts of dodecylbenzenesulphonic acid and heated to 180° C. After about 5 hours of water elimination an AN of 52 had been reached. The light brownish product is a waxy solid at RT.

Example 6

Half-Ester Composed of Adipic Acid and Precursor A3

18.6 parts of adipic acid and 191 parts of precursor A3 are homogenized under inert gas, treated with 2.1 parts of dodecylbenzenesulphonic acid and heated to 180° C. After about 16 hours of water elimination an AN of 23 had been reached. The brownish product is a waxy solid at RT.

Example 7

Half-Ester Composed of Adipic Acid and Precursor A4

18.6 parts of adipic acid and 191 parts of precursor A4 are homogenized under inert gas, treated with 2.1 parts of dodecylbenzenesulphonic acid and heated to 180° C. After about 4 hours of water elimination an AN of 32 had been reached. The light brownish product is a waxy solid at RT.

Example 8

Half-Ester Composed of Adipic Acid and Precursor A5

18.6 parts of adipic acid and 191 parts of precursor A5 are homogenized under inert gas, treated with 2.1 parts of dodecylbenzenesulphonic acid and heated to 170° C. After about 4 hours of water elimination an AN of 33 had been reached. The light brownish product is a waxy solid at RT.

Example 9

Half-Ester Composed of Adipic Acid and Precursor A8

14.6 parts of adipic acid and 170 parts of precursor A8 are homogenized under inert gas, treated with 2.3 parts of dodecylbenzenesulphonic acid and heated to 170° C. After about 4 hours of water elimination an AN of 30 had been reached. The light brownish product is a waxy solid at RT.

Example 10

Half-Ester Composed of Adipic Acid and Precursor A9

14.6 parts of adipic acid and 250 parts of precursor A9 are homogenized under inert gas, treated with 2.5 parts of dodecylbenzenesulphonic acid and heated to 175° C. After about 6 hours of water elimination an AN of 20 had been reached. The light brownish product is a waxy solid at RT.

Precursor S1

Preparation of a Silicone-Containing Epsilon-Caprolactone Polyester 35 g of an alpha, omega-hydroxyalkyl-functional dimethylpolysiloxane with a total molar mass of about 1800 g/mol are reacted with 150.4 g of epsilon-caprolactone. For this, the mixture is allowed to react for about 8 hours in an $N_2$ atmosphere at 160° C. with addition of 0.035 g of DBTL. During this time, the progress of the reaction can be followed via determination of the non-volatile fractions. The reaction has ended when the content of non-volatile fractions is greater than 98%. The final product is a yellow, waxy solid. The alpha, omega-hydroxyalkyl-functional dimethylpolysiloxane used as starter alcohol is obtained in a manner known to the person skilled in the art, via an addition reaction of suitable unsaturated alcohols (e.g. the allyl alcohol used in this example) onto dimethylpolysiloxanes which bear terminal silane units.

Precursor S2-S7

The following other silicone-containing polyesters were prepared by analogy with precursor S1:

| Precursor No. | Hydroxyalkyl-functional dimethylpolysiloxane used | Amount of cyclic ester used |
| --- | --- | --- |
| S2 | 35 g of alpha, omega-hydroxyalkyl-functional dimethylpolysiloxane with Mn of 1800 g/mol | 300.8 g of epsilon-caprolactone |
| S3 | 35 g of alpha, omega-hydroxyalkyl-functional dimethylpolysiloxane with Mn of 1800 g/mol | 75.2 g of epsilon caprolactone |
| S4 | 35 g of alpha, omega-hydroxyalkyl-functional dimethylpolysiloxane with Mn of 900 g/mol | 75.2 g of epsilon-caprolactone |
| S5 | 35 g of alpha, omega-hydroxyalkyl-functional dimethylpolysiloxane with Mn of 900 g/mol | 120.4 g of epsilon-caprolactone + 30 g of delta-valerolactone |
| S6 | 35 g of hydroxyalkyl functional dimethylpolysiloxane A[*1] | 300.8 g of epsilon-caprolactone |
| S7 | 35 g of Silaplane FM-0425[*2] | 150.4 g of epsilon-caprolactone |

[*1]Hydroxyalkyl-functional dimethylpolysiloxane A is a polydimethylsiloxane which bears an average of 3 hydroxy functions distributed over the polydimethylsiloxane chain and has a molar mass of about 2000 g/mol. The hydroxy functions were generated via the addition reaction of allyl alcohol onto the corresponding silane-containing precursor.
[*2]Silaplane FM-0425 is a commercially available product from Chisso Corporation, Japan. It is a monohydroxyalkyl-terminated polydimethylsiloxane with a molar mass of about 10,000 g/mol.

The precursors S2-S7 prepared are waxy white to yellow solids.

Example 11

Preparation of a Silicone-Containing Epsilon-Caprolactone Polyester Having Carboxylic Acid Functionality Reaction of the Hydroxy Groups of Precursor S1 with Adipic Acid 130 g of precursor S1 are reacted with 7.1 g of adipic acid. For this, the two components are heated to 160° C. for 4-5 h, with stirring, under $N_2$ after addition of 0.25 g of para-toluenesulphonic acid. The progress of the reaction can be followed by way of the reduction in the acid number. The reaction has ended when the acid number has reached half of the theoretical acid number of the starting mixture. In the case described here, the reaction was ended when the acid number was 19.9 (theoretical initial value 39.8).

The following other examples were prepared by analogy with Example 11:

| Example No. | Precursor used | Difunctional carboxylic acid used |
| --- | --- | --- |
| 12 | 100 g of precursor S1 | 11.9 g of dimerized tall oil fatty acid (AN: 198) |
| 13 | 100 g of precursor S1 | 2.5 g of succinic acid |
| 14 | 100 g of precursor S1 | 3.6 g of 1,4-cyclohexanedicarboxylic acid |
| 15 | 100 g of precursor S2 | 1.7 g of adipic acid |
| 16 | 100 g of precursor S3 | 5.2 g of adipic acid |
| 17 | 100 g of precursor S4 | 10.3 g of adipic acid |
| 18 | 100 g of precursor S5 | 6.1 g of adipic acid |

-continued

| Example No. | Precursor used | Difunctional carboxylic acid used |
|---|---|---|
| 19 | 100 g of precursor S6 | 2.3 g of adipic acid |
| 20 | 500 g of precursor S8 | 1.4 g of adipic acid |

These products are yellow to brownish waxy solids.

Use Examples

Colour masterbatches composed of pigment, thermoplastic and dispersing agent were prepared in a Berstorff ZE 25/40 D twin-screw extruder. To determine colour strength, a white compounded material was prepared from 5.5 parts of white pigment (silane-treated $TiO_2$/for example, Kronos 2220) in 94.5 parts of HDPE (e.g. Eraclene MP90 from Polimeri Europa; density: 0.96 g/ml, MFI: 7 g/10 min, to ASTM D1238) and coloured via mixing with 2.5% of the respective colour masterbatch to be tested, on a Polymix 110L two-roll mill. 22 g of this coloured mixture were used in each case to produce test plaques for colour strength measurement via pressing for 30 seconds in a Polystat 200T press.

The colour strength difference from the respective 0 specimen without dispersing agent was determined using a Byk Gardner Color-Guide Sphere d/8 spin.

Pigment colour masterbatches were prepared from pigment, and dispersing agent whose identity and amount is stated in the tables below, the remainder being composed of thermoplastic.

This revealed not only the improved colour strength of the test plaques produced with the inventive products but also markedly fewer pigment agglomerates (specks) than in the 0 specimens and Comparative Examples.

| Masterbatch composed of 20% of Irgalith Yellow WSR, CIBA - (CI P.Y. 62) in HDPE (Eraclene MP90) | | |
|---|---|---|
| Dispersing agent according to Example | Parts of dispersing agent used | % colour strength |
| 0 specimen without dispersing agent* | 0 | 100 |
| 1 | 6 | 110 |
| 1 | 10 | 111 |
| 3 | 6 | 111 |
| 3 | 10 | 114 |
| 4 | 6 | 109 |
| 4 | 10 | 110 |
| 5 | 6 | 115 |
| 5 | 10 | 140 |
| 6 | 6 | 113 |
| 6 | 10 | 124 |
| 7 | 6 | 124 |
| 7 | 10 | 128 |
| 8 | 6 | 115 |
| 8 | 10 | 130 |
| 9 | 6 | 121 |
| 9 | 10 | 140 |
| 11 | 6 | 127 |
| 11 | 10 | 145 |
| Precursor A2* | 6 | 101 |
| Precursor A3* | 6 | 102 |
| Precursor A4* | 6 | 102 |
| Precursor A5* | 6 | 101 |

*non-inventive Comparative Example: (Precursors A2-A5 were used as dispersing agent without reaction with a dicarboxylic acid)

| Masterbatch composed of 20% of Hostaperm Pink E, Clariant - (CI P.V. 19) in HOPE (Eraclene MP90) | | |
|---|---|---|
| Dispersing agent according to Example | Parts of dispersing agent used | % colour strength |
| 0 specimen without dispersing agent* | 0 | 100 |
| 3 | 6 | 135 |
| 3 | 10 | 145 |
| 4 | 6 | 114 |
| 4 | 10 | 135 |
| 5 | 6 | 118 |
| 5 | 10 | 167 |
| 6 | 6 | 127 |
| 6 | 10 | 162 |
| 7 | 6 | 139 |
| 7 | 10 | 160 |
| 8 | 6 | 132 |
| 8 | 10 | 168 |
| 9 | 6 | 123 |
| 9 | 10 | 146 |
| 11 | 6 | 128 |
| 11 | 10 | 148 |

| Masterbatch composed of 20% of Heliogen Blue, BASF - (CI P.B. 15:3) in LDPE, MFI 20 g/10 min. | | |
|---|---|---|
| Dispersing agent according to Example | Parts of dispersing agent used | % colour strength |
| 0 specimen without dispersing agent* | 0 | 100 |
| A* | 6 | 103 |
| B* | 6 | 105 |
| 8 | 6 | 120 |
| 9 | 6 | 121 |
| 11 | 6 | 123 |

*non-inventive Comparative Example

Comparative Example A

Non-Inventive

This is a melt mixture according to Example 2 of DE 195 16 387 composed of the following components: 47.5% by weight of a substantially amorphous poly-alpha-olefin (as in Comparative Example B of DE 195 16 387), 47.5% by weight of a polyolefin wax (as in Comparative Example C of DE 195 16 387) and 5% by weight of the polyacrylate according to Comparative Example D of DE 195 16 387.

Comparative Example B

Non-Inventive

Licowax PE 520 was used, a non-functionalized low-pressure polyethylene wax from Clariant.

Comparative Example C

Non-Inventive

Licowax PP 230 was used, a non-functionalized polypropylene wax from Clariant.

Masterbatch composed of 40% of Heliogen Blue, BASF - (CI P.B. 15:3) in LDPE, MFI 20 g/10 min.

| Dispersing agent according to Example | Parts used of dispersing agent | % colour strength | Pressure filter value to DIN EN 13900-5 [bar/g] |
|---|---|---|---|
| 0 specimen without dispersing agent* | 0 | 100 | 2.5 |
| 8 | 20 | 122 | 1.0 |
| 9 | 20 | 126 | 0.8 |
| 11 | 20 | 125 | 1.2 |
| Mixture composed of: | | 129 | 0.9 |
| 9 and | 10 | | |
| Melt 1000 (metallocene-catalyzed LLDPE, Dow Chemicals) | 10 | | |

Masterbatch composed of 20% of Heliogen Blue, BASF - (CI P.B. 15:3) in polypropylene homopolymer, MFI 25 g/10 min.

| Dispersing agent according to Example | Parts of dispersing agent used | % colour strength |
|---|---|---|
| 0 specimen without dispersing agent* | 0 | 100 |
| A* | 10 | 109 |
| B* | 10 | 114 |
| C* | 10 | 117 |
| 8 | 10 | 149 |
| 9 | 10 | 165 |
| 11 | 10 | 150 |

*non-inventive Comparative Example

Masterbatch composed of 40% of Heliogen Blue, BASF - (CI P.B. 15:3) in polypropylene homopolymer, MFI 25 g/10 min.

| Dispersing agent according to Example | Parts used of dispersing agent | % colour strength |
|---|---|---|
| 0 specimen without dispersing agent* | 0 | 100 |
| C* | 20 | 115 |
| 8 | 20 | 153 |
| 9 | 20 | 166 |
| 11 | 20 | 155 |
| Mixture composed of: | | 130 |
| 9 and | 10 | |
| C | 10 | |

*non-inventive Comparative Example

Masterbatch composed of 20% of Irgalith Red LCB, Ciba - (CI P.R. 53:1) in LDPE, MFI 29 g/10 min.

| Dispersing agent according to Example | Parts of dispersing agent used | % colour strength |
|---|---|---|
| 0 specimen without dispersing agent* | 0 | 100 |
| A* | 10 | 98 |
| B* | 10 | 108 |
| 8 | 10 | 125 |
| 9 | 10 | 124 |
| 11 | 10 | 126 |

*non-inventive Comparative Example

The invention claimed is:

1. Dispersing agent for pigment concentrates for the colouring of thermoplastics, which has the general formula

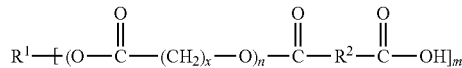

in which
R$^1$ is the organic radical of a polysiloxane which has from 1 to 3 hydroxy groups not bonded to a silicon atom,
R$^2$ is a divalent, straight-chain or branched aliphatic or cycloaliphatic radical,
x is from 2 to 18, n is from 10 to 500 and m is from 1 to 3, has a molar mass of from 1000 to 20000 g/mol and an acid number of from 3 to 180 mgKOH/g and
is solid at room temperature.

2. Dispersing agent according to claim 1, characterized in that R is the radical of a mono- to trihydroxy-functional dialkylpolysiloxane.

3. Process for preparing a dispersing agent according to claim 1, characterized in that one or more cyclic lactones are reacted, with ring-opening, with a polysiloxane which has from 1 to 3 hydroxy groups not bonded to a silicon atom, and the polyester obtained as precursor is reacted with a dicarboxylic acid or with a corresponding dicarboxylic anhydride to form a half-ester of the dicarboxylic acid.

4. A method to disperse pigments, fillers, other fine-particle solids or a combination thereof in thermoplastics comprising mixing pigments, fillers, other fine-particle solids or a combination thereof, thermoplastic polymer and a polyester of the general formula

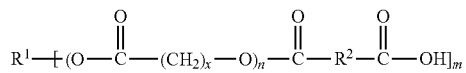

in which
R$^1$ is the organic radical of a compound having from 1 to 3 hydroxy groups per molecule, or the radical of a polysiloxane which has from 1 to 3 hydroxy groups not bonded to a silicon atom,
R$^2$ is a divalent, straight-chain or branched aliphatic or cycloaliphatic radical,
x is from 2 to 18, n is from 10 to 500 and m is from 1 to 3, where the polyester
has a molar mass of from 1000 to 20000 g/mol and an acid number of from 3 to 180 mgKOH/g and
is solid at room temperature.

5. Masterbatch for incorporation into thermoplastics, comprising pigments, fillers, other fine-particle solids or a combination thereof, thermoplastic polymer and a polyester of the general formula

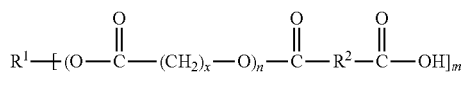

in which
R$^1$ is the organic radical of an alcohol having from 1 to 3 OH groups, or the radical of a polysiloxane which has from 1 to 3 hydroxy groups not bonded to a silicon atom,
R$^2$ is a divalent, straight-chain or branched aliphatic or cycloaliphatic radical,
x is from 2 to 18, n is from 10 to 500 and m is from 1 to 3, where the polyester
has a molar mass of from 1000 to 20000 g/mol and an acid number of from 3 to 180 mgKOH/g and
is solid at room temperature, and is present in a proportion of from 1 to 25% by weight, based on the total weight of the masterbatch.

6. A shaped plastic article of manufacture comprising pigments,
fillers, other fine-particle solids or a
combination thereof, thermoplastic polymer and a
polyester of the general formula

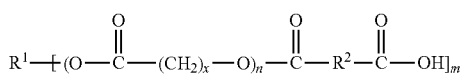

in which
R$^1$ is the organic radical of a compound having from 1 to 3 hydroxy groups per molecule, or the radical of a polysiloxane which has from 1 to 3 hydroxy groups not bonded to a silicon atom,
R$^2$ is a divalent, straight-chain or branched aliphatic or cycloaliphatic radical,
x is from 2 to 18, n is from 10 to 500 and m is from 1 to 3, where the polyester has a molar mass of from 1000 to 20000 g/mol and an acid number of from 3 to 180 mgKOH/g and is solid at room temperature.

* * * * *